Patented Sept. 22, 1953

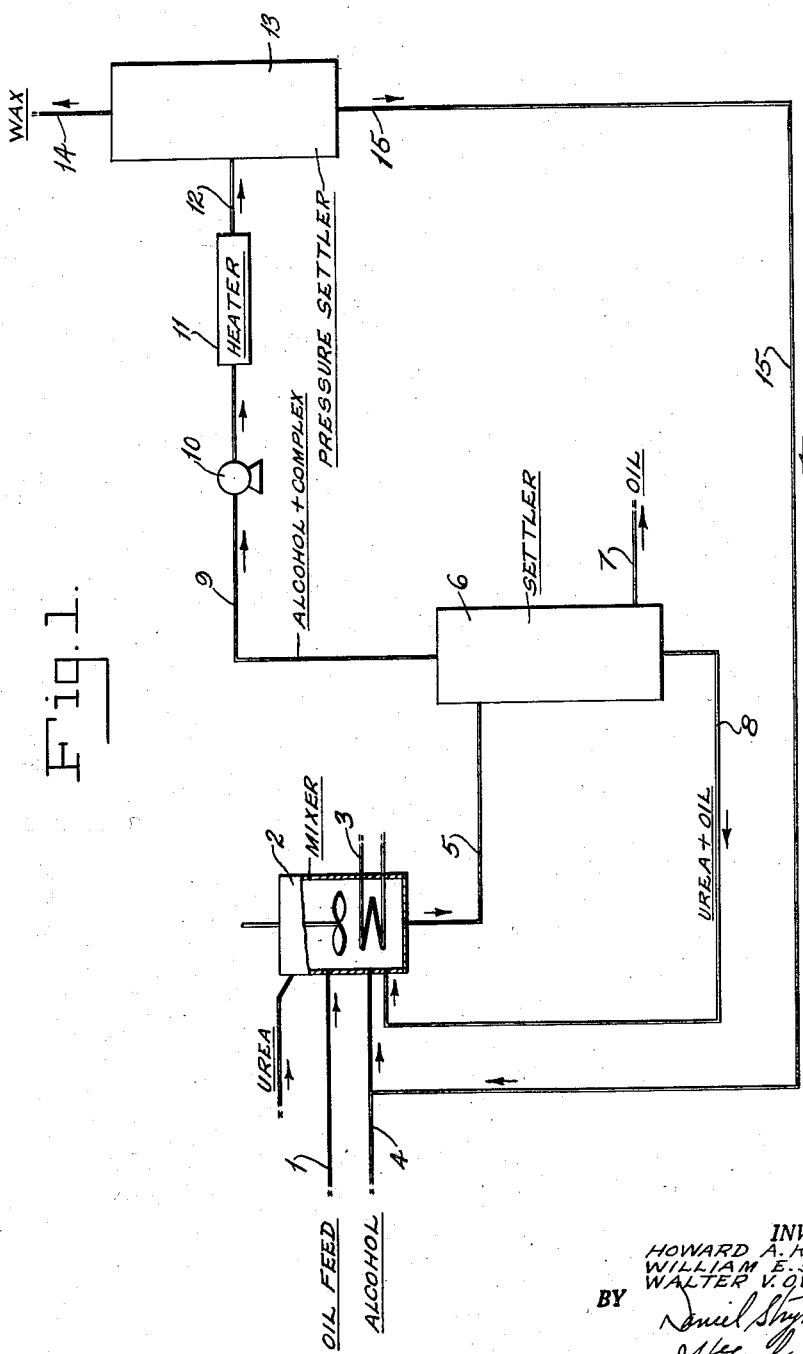

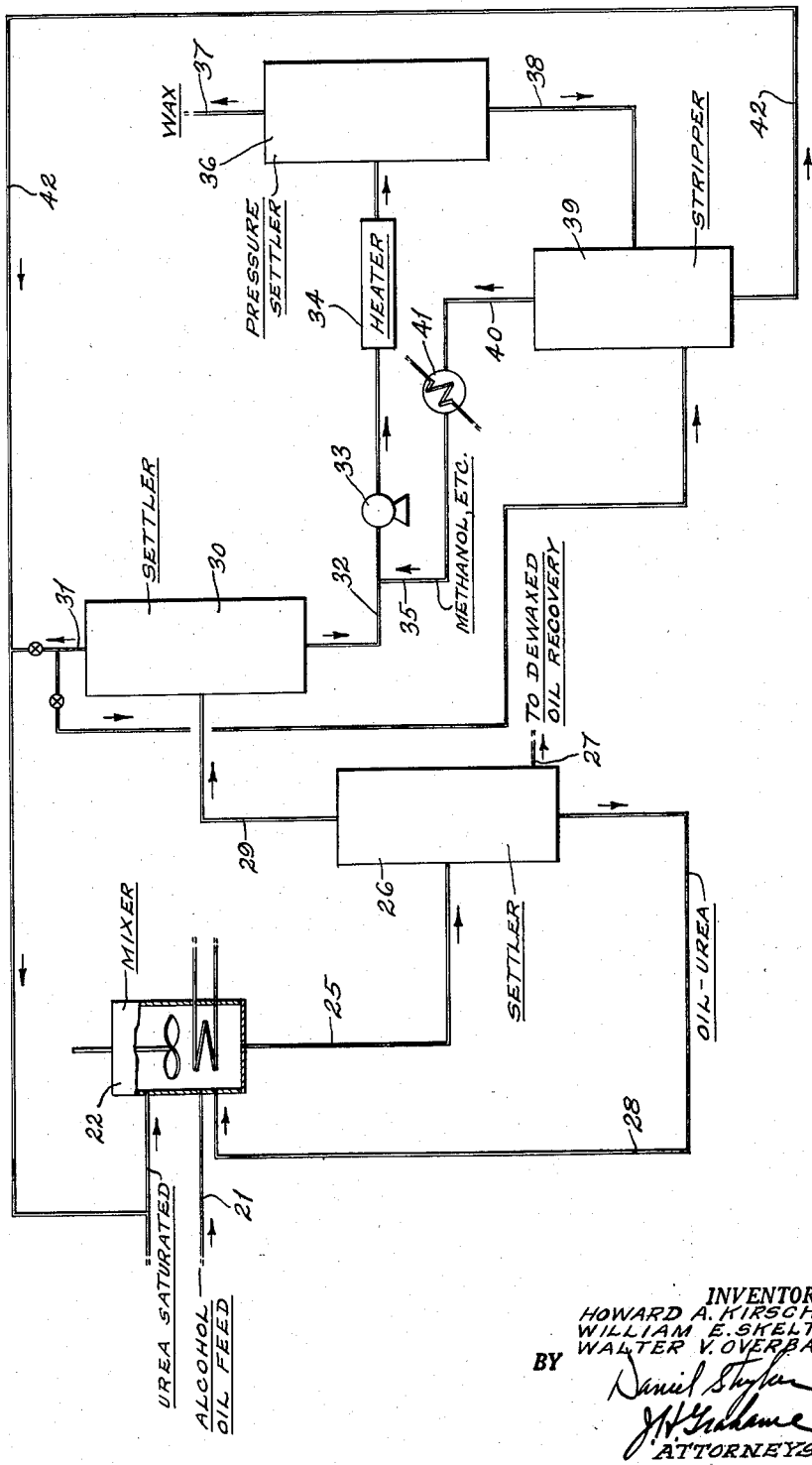

2,653,123

UNITED STATES PATENT OFFICE 2,653,123

CONTINUOUS PROCESS FOR SEPARATION OF WAXLIKE CONSTITUENTS FROM OIL

Howard A. Kirsch and William E. Skelton, Beacon, and Walter V. Overbaugh, Fishkill, N. Y., assignors to The Texas Company, New York, N. Y., a corporation of Delaware Application February 25, 1949, Serial No. 78,252

4 Claims. (Cl. 196—17)

This invention relates to a continuous process for separation of wax-like constituents from oil such as contained in hydrocarbon mixtures with an organic agent such as urea in the presence of a solvent liquid.

The invention concerns a continuous process for separation of wax and wax-like constituents from oil by treatment with an organic complexing agent having the structure:

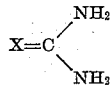

where X may be either oxygen or sulfur. Examples of effective compounds are urea and thiourea and which are capable of forming with waxy constituents of oil, solid crystalline complex compounds which are readily separable from the oil.

More particularly, the invention involves effecting contact between the feed oil and solid crystalline complexing agent in the presence of a solvent liquid at a temperature in the range about normal room temperature to 125° F. although even lower temperatures are permissible. The solvent liquid is advantageously a polar compound which is only partially miscible with the oil and the agent at temperatures below 125° F. but which has high solubility for the complexing agent and relatively low solubility for the feed oil, at least for those constituents of the oil entering into complex formation with the agent, at temperatures up to 180 to 200° F. Examples of suitable solvents are aliphatic alcohols having 1 to 5 carbon atoms per molecule.

The resulting mixture is passed to a settling zone or zones maintained under conditions of temperature and pressure substantially similar to that prevailing during the initial mixing. During settling, formation of an oil-rich phase and a solvent-rich phase containing a solid complex of the agent and wax-like constituents of the oil occurs.

These phases are separately withdrawn. The withdrawn oil phase is subjected to such further treating as may be desired for the purpose of recovering residual solvent and complexing agent therefrom.

The withdrawn solvent-rich phase containing solid complex is subjected to heating, under elevated pressure sufficient to maintain liquid phase conditions, to a temperature such that the complex is decomposed and the complexing agent liberated therefrom is substantially completely dissolved in the solvent. Thus, the solvent phase containing complex may be heated to a temperature ranging from about 180 to 250. The pressure ranging from about 5 to 100 lbs. per sq. in. or sufficient to maintain liquid phase conditions. The hot mixture is then passed to a settling zone wherein it is allowed to separate into phases without substantial reduction in temperature and pressure. Such settling results in the formation of a wax-rich liquid phase and solvent-rich phase containing dissolved complexing agent.

The liquefied wax is drawn off and subjected to further treatment as may be desired in order to recover small amounts of residual solvent and urea.

The withdrawn solvent-rich phase containing dissolved complexing agent is recycled to the first-mentioned treating zone wherein its temperature is reduced so as to cause dissolved complexing agent to crystallize from solution and provide solid complexing agent for contacting with further quantities of fresh feed oil.

It is desirable to maintain excess complexing agent in the mixing zone and this unused complexing agent in solid form passes into the aforementioned settling zone. This excess agent, particularly in cases where relatively low viscosity oils are being treated, settles to the bottom of the oil layer or phase. Accordingly, provision may be made for segregating this portion of the oil-rich phase and recycling it directly to the mixing zone.

The process provides a simplified unitary operation useful in the separation of wax from mineral oil. It provides a simple and economical method of recovering complexing agent and returning it for reuse.

As disclosed in copending application Serial No. 64,272, filed December 9, 1948, by Arnold, Hess, and Skelton for Fractional Separation of Oil With an Organic Complexing Agent in the Presence of a Solvent Liquid, urea enters into complex formation with waxy hydrocarbons, such complex formation apparently being facilitated by the presence of a small amount of alcohol, water or other liquid containing an hydroxyl group sufficient in amount to wet the urea crystals. The crystalline structure appears to involve a hexagonal system and to consist of about 25% wax and 75% urea by weight. The complex is formed at ordinary temperatures and may be decomposed by heating to temperatures of 150 to 180° F. in the presence of a urea solvent.

In order to describe the operation in more detail, reference will now be made to Figure I of the accompanying drawing illustrating the application of the process to the treatment of a wax-bearing mineral oil for the removal of wax therefrom, utilizing urea as the complexing agent in the presence of methyl alcohol as the solvent.

The feed oil such as a relatively low viscosity lubricating oil fraction is conducted from a source not shown through a pipe 1 to a mixing vessel 2 provided with a heat exchange coil 3. The feed oil is advantageously introduced to the mixer 2 at a temperature of about 100° F.

Methyl alcohol at a temperature of about 212°

F. saturated, or at least about 80% saturated, with urea at about that temperature is introduced through a pipe 4 from a subsequent point in the system to the mixer 2.

The mixer is maintained under sufficient pressure to keep the alcohol liquefied. A cooling liquid is caused to flow through the exchanger coil 3 so as to cool the mixture to a temperature of about 100° F. As a result of such cooling, urea is crystallized from the entering alcohol stream.

The alcohol is introduced in an amount so as to provide about 0.5 or 0.6 volume of alcohol per volume of feed oil. At any rate, it is advantageous to regulate the introduction of alcohol and urea to the mixer 2 so that there is always present therein a substantial excess of urea in solid particle form over that required to enter into complex formation with the wax constituents of the feed oil. For example solid urea may be present in the mixing zone in the proportion of about 3 to 4 pounds per pound of wax to be separated.

As indicated in the drawing, the mixture containing the resulting complex is drawn off in a continuous stream from the mixer 2 through pipe 5 to a settler 6 wherein separation into oil-rich and solvent-rich liquid phases occurs. The solvent-rich phase contains the crystalline complex material.

The oil from which wax constituents have thus been removed may be discharged through pipe 7 and may be conducted to suitable recovery means not shown, for the purpose of recovering residual solvent and urea retained in the withdrawn oil. Thus, the withdrawn oil may be subjected to washing with an additional quantity of solvent to extract the residual urea. The resulting solution of urea and solvent may be returned to the system for reuse while the washed oil is distilled to strip off the residual solvent.

On the other hand provision may be made for drawing off through pipe 8 a portion of the oil layer in which is concentrated unused urea crystals. This portion is recycled directly to the mixer 2 as shown.

A stream of solvent-rich phase containing complex is continuously drawn off through pipe 9 and by means of pump 10 forced through a heater or heat exchanger 11 wherein it is heated to a temperature of about 212° F. and under sufficient pressure to maintain the alcohol in liquid phase.

As a result of such heating the complex is decomposed, liberating urea from the wax, the liberated urea being substantially completely dissolved in the hot alcohol.

The hot mixture is discharged from the heater 11 through pipe 12 to a pressure settling zone 13 maintained at substantially the same temperature wherein the wax separates from the hot alcohol solution of urea. The wax in liquefied form is continuously discharged through pipe 14 to suitable recovery means not shown for the purpose of recovering small amounts of residual urea and solvent that may be present therein.

The settler 13 is maintained under substantially the same pressure as prevails in the heater 11 so that the alcohol is maintained in liquid form. The hot solution is drawn off from the settler 13 through a pipe 15 and returned to pipe 4 for reintroduction to the mixer 2 for reuse. By returning the solution while still at elevated temperature, crystallization of urea does not occur in transit thus avoiding the necessity for recycling urea in solid form. Crystallization of urea is effected after the recycled stream enters the mixer 2.

Provision may be made for supplying make-up alcohol to offset losses incurred in the operation. Likewise, provision may be made for supplying make-up urea. Such make-up urea may be introduced to the mixer 2 either in the form of a saturated hot solution in alcohol or may be introduced in solid crystalline form directly to the mixer 2.

While methyl alcohol has been specifically mentioned, it is contemplated that other low molecular weight alcohols having from 1 to about 5 carbon atoms per molecule may be employed such as ethyl alcohol, normal propyl and isopropyl alcohol, particularly by employing a modified type of flow such as illustrated in Figure II. Still other solvents may be used which have relatively low solubility for oil and wax under the conditions prevailing and yet are capable of selectively dissolving urea or other suitable complexing agent at elevated temperature.

Referring now to Figure II, the oil feed passes through pipe 21 to mixer 22, similar to mixer 2 of Figure I and is contacted with isopropyl alcohol saturated with urea at about 212° F. The resulting mixture flows out through pipe 25 to a settler 26 wherein phase separation occurs as in settler 6 of Figure I.

The oil from which wax constituents have been removed is discharged through pipe 27.

Likewise a concentrate of free urea crystals may be drawn off through pipe 28 for return to mixer 22.

The complex-containing layer is removed through pipe 29 to another settler 30 maintained at substantially the same temperature. Here an alcohol layer saturated with urea, and a complex-rich layer form. The former is removed through pipe 31 and returned to mixer 22. The complex layer is drawn off through pipe 32 and pump 33 to heater 34 wherein it is heated, in the presence of a polar solvent such as methyl alcohol added from pipe 35, to a temperature of about 200 to 212° F. to break the complex. The methyl alcohol is added in the proportion of about 1 volume per 1 volume of complex. This second polar solvent is one which has very little wax solubility and high urea solubility. It must be of lower boiling range than the initial solvent used in mixer 22. Suitable solvents other than methyl alcohol are liquid ammonia, n-propanol-water azeotrope, etc.

From the heater the hot mixture passes to settler 36. Molten wax is drawn off through pipe 37 while solvent-urea mixture is drawn off through pipe 38 to a stripper 39 wherein methyl alcohol is distilled from the mixture, the distillate being removed through pipe 40, exchanger 41 and pipe 35 for return to the system.

The hot residual liquid from stripper 39 comprising isopropyl alcohol and urea is drawn off through pipe 42 for return to mixer 22.

A portion of the top layer from settler 30 may be passed directly to the lower portion of the stripper 39 to facilitate removal of urea which might otherwise tend to crystallize at this point.

While isopropyl alcohol has been mentioned in describing Figure II, it is contemplated that other higher alcohols may be employed in the mixer 2. Alcohols having from 2 to 5 or more carbon atoms per molecule may be used for complex formation while methyl alcohol is used for complex breaking.

While the treatment of mineral wax-bearing oil has been referred to nevertheless it is contemplated that the process of this invention may have application to the treatment of other types of oil as well as other fractions of mineral oil useful in the manufacture of lubricants, diesel oils, jet turbine fuel etc. It may have application to the treatment of oil derived from animal, vegetable and marine sources in order to effect removal therefrom of constituents which enter into complex formation with urea and the like. Oxygen-containing compounds enter into complex formation with urea, also it has been found that normal olefins and also naphthenic and aromatic hydrocarbons having long aliphatic side chains enter into complex formation.

The process may be applied to the treatment of used oils to remove oxidized and other constituents therefrom. It may be applicable to the separation of olefins, aromatic and naphthenic compounds from mixtures containing them, with the aid of complexing agents capable of entering into complex formation with the compound which it is desired to remove from the mixture.

It may be applied to the treatment of oils which have been subjected to a previous treatment such as oxidation or hydrogenation resulting in the formation of constituents capable of entering into complex formation with the complexing agent.

It may be applied to the treatment of oils which have been previously dewaxed by conventional low temperature operations but which still retain wax constituents, the removal of which is desired. On the other hand, the process may be used to effect a preliminary removal of wax constituents prior to a low temperature dewaxing operation. It may be applied to the fractionation of waxy concentrates and also to the deoiling of wax concentrates. In the case of relatively viscous feed stocks, it is contemplated that the feed stock may be diluted with a non-polar solvent such as liquefied normally gaseous hydrocarbons or normally liquid naphtha hydrocarbons. The invention may also be used for effecting separation between normally liquid paraffinic and non-paraffinic hydrocarbons, for example, it may be used to effect separation between paraffins and aromatic hydrocarbons.

It is also contemplated that certain derivatives of urea such as the substituted ureas may be employed, for example, ethanol urea, diethyl urea and butyl urea.

Obviously many modifications and variations of the invention, as hereinbefore set forth, may be made without departing from the spirit and scope thereof, and therefore only such limitations should be imposed as are indicated in the appended claims.

We claim:

1. A continuous method of separating wax from wax-bearing mineral oil by treatment with an organic agent having the structure:

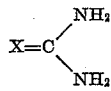

where X is selected from the group consisting of oxygen and sulfur and which is capable of entering into solid complex formation with wax constituents of oil, comprising passing a hot stream of aliphatic alcohol having from 2 to 5 carbon atoms per molecule and saturated with said agent at a temperature of about 212° F. into a contact zone, maintaining said zone under pressure sufficiently elevated to keep the alcohol liquefied, passing to said zone a stream of said oil, subjecting said oil and saturated alcohol to mixing within said zone while reducing the mixture to a temperature of about 100 to 125° F. such that a portion of said agent is crystallized from solution, supplying make-up alcohol and agent to said contact zone, regulating the introduction of alcohol and agent to the contact zone so as to maintain therein complexing agent in crystalline form in an amount which is substantially in excess of that required to enter into complex formation with wax constituents of the feed oil and such that the volume of alcohol is substantially less than the volume of oil in the contact zone, effecting crystalline complex formation between the agent and wax constituents of the oil, passing the resulting mixture of oil, alcohol, unreacted solid agent and complex to a first settling zone, forming therein an alcohol-rich layer containing crystalline complex material, an oil-rich inter-phase layer substantially free from complex, and a lower slurry layer comprising free agent crystals suspended in oil, separately withdrawing streams from each layer, discharging the withdrawn oil-rich interphase stream, recycling the withdrawn slurry stream to the contacting zone, passing the withdrawn alcohol-rich stream to a second settling zone, forming in the second settling zone a secondary alcohol-rich layer saturated with the agent and a secondary complex-rich layer, separately withdrawing streams from both said last mentioned layers, passing a portion of the withdrawn secondary alcohol-rich stream to the contacting zone, commingling the withdrawn secondary complex-rich stream with a solvent liquid having high solubility for the agent and low solubility for wax and relatively lower boiling than the aforesaid alcohol, subjecting the commingled mixture to heating such that said complex decomposes with liberation of wax and solution of agent in the solvent, separately withdrawing liberated wax and said solution, discharging the withdrawn wax, passing the withdrawn solution to a fractional distillation zone, passing the remaining portion of the withdrawn secondary alcohol-rich stream to said distillation zone, distilling the volatile solvent from said distillation zone at a temperature sufficiently elevated to form a residual hot solution of recovered agent in alcohol, and recycling said hot solution to said contact zone.

2. A continuous method of separating wax from wax-bearing mineral oil comprising passing a hot stream of aliphatic alcohol having from 2 to 5 carbon atoms per molecule and saturated with urea at a temperature of about 212° F. into a contact zone, maintaining said zone under pressure sufficiently elevated to keep the alcohol liquefied, passing to said zone a stream of said oil, subjecting said oil and saturated alcohol to mixing within said zone while reducing the mixture to a temperature of about 100 to 125° F. such that a portion of said urea is crystallized from solution, supplying make-up alcohol and urea to said contact zone, regulating the introduction of alcohol and urea to the contact zone so as to maintain therein urea in crystal form in an amount which is substantially in excess of that required to enter into complex formation with wax constituents of the feed oil and such that the volume of alcohol is substantially less than the volume of oil in the contact zone, effecting crystalline complex formation between urea and wax constituents of the oil, passing the resulting mixture of oil, alcohol, unreacted urea crystals and complex to a first settling zone, forming therein an alcohol-rich layer containing crystalline complex material, an oil-rich inter-phase layer substantially free from complex, and a lower slurry layer comprising free urea crystals suspended in oil, separately withdrawing streams from each layer, discharging the withdrawn oil-rich inter-phase stream, recycling the withdrawn slurry stream to the contacting zone, passing the withdrawn alcohol-rich stream to a second settling zone, forming in the second settling zone a secondary alcohol-rich layer saturated with urea and a secondary complex-rich layer, separately withdrawing streams from both said last mentioned layers, passing a portion of the withdrawn secondary alcohol-rich stream to the contacting zone, commingling the withdrawn secondary complex-rich stream with a solvent liquid having high solubility for urea and low solubility for wax and relatively lower boiling than the aforesaid alcohol, subjecting the commingled mixture to heating such that said complex decomposes with liberation of wax and solution of urea in the solvent, separately withdrawing liberated wax and said solution, discharging the withdrawn wax, passing the withdrawn solution to a fractional distillation zone, passing the remaining portion of the withdrawn secondary alcohol-rich stream to said distillation zone, distilling the volatile solvent from said distillation zone at a temperature sufficiently elevated to form a residual hot solution of recovered urea in alcohol, and recycling said hot solution to said contact zone.

3. A continuous method of separating wax from wax-bearing mineral oil by treatment with a complexing agent selected from the group consisting of urea and thiourea which comprises passing a hot stream of aliphatic alcohol having from 1 to 5 carbon atoms per molecule and saturated with said agent at a temperature of about 212° F. into a contact zone, maintaining said zone under pressure sufficiently elevated to keep the alcohol liquefied, passing to said zone a stream of said oil, subjecting said oil and saturated alcohol to mixing within said zone while reducing the mixture to a temperature in the range about 100 to 125° F. such that a portion of said agent is crystallized from solution, supplying make-up alcohol and agent to said contact zone, regulating the introduction of alcohol and agent to the contact zone so as to maintain therein complexing agent in crystalline form in an amount which is substantially in excess of that required to enter into complex formation with wax constituents of the feed oil and such that the volume of alcohol is substantially less than the volume of oil in the contacting zone, effecting crystalline complex formation between the agent and wax constituents of the oil, passing the resulting mixture of oil, alcohol, unreacted solid agent and complex to a settling zone, forming therein an alcohol-rich layer containing crystalline complex material, an oil-rich inter-phase layer substantially free from complex, and a lower slurry layer comprising unreacted solid agent suspended in oil, separately withdrawing streams from each layer, discharging the withdrawn oil-rich interphase stream, recycling the withdrawn slurry stream to the contacting zone, recovering alcohol from the withdrawn alcohol-rich stream, and passing it at elevated temperature to the contact zone to form said hot alcohol stream.

4. The method according to claim 3 in which the solid agent present in the contact zone amounts to about 3 to 4 pounds per pound of wax to be separated.

HOWARD A. KIRSCH.
WILLIAM E. SKELTON.
WALTER V. OVERBAUGH.

References Cited in the file of this patent

UNITED STATES PATENTS

| Number | Name | Date |
|---|---|---|
| 1,830,859 | Schotte et al. | Nov. 10, 1931 |
| 2,300,134 | Priewe | Oct. 27, 1942 |
| 2,376,008 | Riethof | May 15, 1945 |
| 2,499,820 | Fetterly | Mar. 7, 1950 |
| 2,520,715 | Fetterly | Aug. 29, 1950 |

OTHER REFERENCES

Technical Oil Mission, Reel 143, translation by Shell Development Co. of German application B 190,197 (Bengen), May 31, 1946 (5 pages; pages 2–6 inclusive, only).